United States Patent [19]

Fuller

[11] 4,294,857

[45] Oct. 13, 1981

[54] DOG FOOD COMPOSITIONS OF IMPROVED PALATABILITY TO DOGS

[75] Inventor: Mary L. Fuller, Pacific, Mo.

[73] Assignee: Ralston Purina Company, St. Louis, Mo.

[21] Appl. No.: 100,600

[22] Filed: Dec. 5, 1979

[51] Int. Cl.$^3$ .............................................. A23K 1/00
[52] U.S. Cl. ..................................... 426/99; 426/303; 426/307; 426/623; 426/630; 426/635; 426/805
[58] Field of Search .................. 426/99, 623, 807, 805, 426/538, 650, 651, 132, 303, 307, 630, 635

[56] References Cited

U.S. PATENT DOCUMENTS

| | | | |
|---|---|---|---|
| 2,921,853 | 1/1960 | Card et al. | 426/132 X |
| 3,745,023 | 7/1973 | Greenberg et al. | 426/805 X |
| 3,857,968 | 12/1974 | Haas et al. | 426/805 X |

OTHER PUBLICATIONS

Furia et al., "Fenaroli's Handbook of Flavor Ingredients" CRC Press, Second Edition, vol. 2 (1976) p. 320.

*Primary Examiner*—R. B. Penland
*Attorney, Agent, or Firm*—Joseph M. Hageman

[57] ABSTRACT

A dog food composition of improved palatability to dogs is disclosed as well as a method of generally enhancing the palatability of dried or intermediate moisture dog food compositions having a moisture content of less than about 50% by weight of the composition by adding thereto a palatability enhancing amount of 3,7-dimethyl-1,6-octadien-3-ol, preferably in an amount of between about 0.0001 to 0.001% by weight of the composition.

43 Claims, No Drawings

DOG FOOD COMPOSITIONS OF IMPROVED PALATABILITY TO DOGS

BACKGROUND OF THE INVENTION

This invention generally relates to a food composition having increased palatability to dogs and specifically relates to the use of a palatability enhancing amount of 3,7-dimethyl-1,6-octadien-3-ol on the dog food composition to provide the improvement in palatability.

Dried animal or pet foods are widely marketed for pets such as cats and dogs. Generally, commercially sold dried pet food products have a relatively low moisture content of less than about 12% by weight and provide excellent nutrition. The lower moisture content permits a higher degree of nutritional balancing of ingredients. Typically, these dried pet food products are expanded or puffed products produced by extrusion techniques.

Extrusion cooking processes for the production of dry pet foods have been a significant factor in the growth of this market segment because of the better cooking achieved with this type of process, and better mixing of ingredients, as well as the desirable texture achieved with a puffed or expanded product. Dry products produced by this type of process are generally well accepted by the animal, but they are significantly lower in palatability than canned or high moisture products that typically contain meat and have a moisture content above 50% by weight. Therefore, although a dry product for dogs is extremely convenient to use by the pet owner and exceptionally nutritious, a need has continually existed for additives or ingredients that can be included in the food product to increase palatability of the product to dogs without reducing the nutritive properties of the product.

One solution to the problem of reduced palatability of dried dog foods is to increase the moisture content to a point where the dog will more readily accept it but to a point that is below the level of moisture at which canning or sterilization of the product is required for maximum bacteriological stability. This has been satisfactorily achieved in the so-called intermediate moisture pet foods wherein the moisture content of the product is typically between 15–45% by weight and the water activity thereof is controlled to provide bacteriological and mycotic stability. Typical food products wherein sugar solutions and water soluble solids are used to provide bacteriological stability are characterized in U.S. Pat. Nos. 3,202,514; 3,482,985; 3,515,838; 3,615,652; and 3,653,908. Other preservatives suitable for food use that are bactericidal in nature may also be used to stabilize the product bacteriologically.

While these intermediate moisture type products are more palatable to dogs than those of the low moisture type, they are not as palatable as the high moisture products. In addition, the intermediate moisture type products suffer from the deficiency that the preservative system needed for this type of product often depresses palatability below that obtained for the same product without the preservative. Furthermore, ingredient formulation becomes exceptionally critical in these intermediate moisture and dry products and formulations typically cannot be altered by the use of ingredients of equal nutritive properties unless it can be determined that the alternative ingredient does not depress palatability. Since each ingredient used must be evaluated not only for its nutritive properties but also for its relative effect on palatability, the formulation of the intermediate moisture type product is complex. The flexibility in formulation that a pet food manufacturer would like to have is consequently reduced. The need for palatability enhancing additives for dog foods has, therefore, not been obviated by the introduction of intermediate moisture type products.

The present invention represents a significant improvement in enhancing the palatability of dog food compositions by applying a palatability enhancing amount of 3,7-dimethyl-1,6-octadien-3ol to the dog food composition.

It is, therefore, an object of the present invention to provide a dog food composition that is more palatable to dogs than conventional dog food compositions.

It is a further object of this invention to provide a method of enhancing the palatability of a dog food material of the dry or intermediate moisture type.

It is a further object of the present invention to provide a process for the enhancement of palatability of a dog food material that is generally useful and easy to apply on a commercial scale.

SUMMARY OF THE INVENTION

A dog food composition of improved palatability to dogs is provided wherein a palatability enhancing amount of 3,7-dimethyl-1,6-octadien-3-ol is applied to the surface of the dog food composition. 3,7-Dimethyl-1,6-octadien-3-ol is commonly known as "Linalool". It may be synthesized in the lab—Indian Pat. No. 131,452 discloses such a synthesis, or is available commercially either prepared by synthesis or prepared by fractionation of naturally occurring volatile oils. It is a colorless, liquid, terpene alcohol having the empirical formula of $C_{10}H_{18}O$. It may be found in the volatile oils obtained from various flowers, fruits, grasses, leaves, roots, seeds and woods, and is also a biosynthetic product of the yeast *Kluyveromyces lactis*. It is soluble in most oils thus permitting its application to dog food compositions dissolved in the fat that is typically added as a coating to dog food compositions. It has been determined that dogs significantly prefer the dog food compositions of the present invention containing a palatability enhancing amount of linalool to the same dog food compositions without linalool.

The present means of enhancing the palatability of dog food compositions has been found to be applicable to a wide range of commercial dog food products and specifically to dog foods having a moisture content of less than about 50% by weight, thus including the dry and intermediate moisture dog foods. As previously noted, the dry and intermediate moisture products have a greater need for a palatability enhancing additive than does a high moisture canned dog food product wherein a high moisture content and fresh meat provide a high degree of palatability.

Various processes and methods of applying the linalool to the particles of the dog food compositions may be employed including: applying the linalool to the particles without the addition of fat; applying it concurrently with the fat coating; or applying it sequentially either as the inner or outer layer with the fat coating although it is most conveniently uniformly mixed and applied with the fat. Regardless of the method of application, the presence of linalool on the particles of the dog food composition provides the maximum degree of taste sensor response from dogs resulting in a statistically significant improvement in palatability.

DESCRIPTION OF THE PREFERRED EMBODIMENTS

The dog food compositions and methods of enhancing the palatability thereof to which the present invention is intended to apply generally relate to a nutritionally balanced mixture of proteinaceous and farinaceous ingredients having a moisture content of less than about 50% by weight. It may, therefore, be said that the present invention is intended to apply to dry or intermediate moisture pet foods as these terms are known to a person skilled in the art of pet food formulation and manufacturing.

The dog food compositions of the present invention to which the linalool is added are not intended to be restricted by any specific listing of ingredients since these will be entirely dependent upon the nutritional balance of the ration desired as well as their availability to the pet food manufacturer. Generally, aside from the nutrition balancing additives such as vitamins and minerals, or other additives such as preservatives, emulsifiers, and the like, included in products of this type, commercial dog food compositions for the most part consist of ingredients that may either be termed substantially proteinaceous or ingredients that may be termed substantially farinaceous. Although the following description should not be considered limiting for the purposes of the present invention, the proteinaceous ingredient may be defined as any material having a protein content of at least about 15% by weight whereas the farinaceous material may be defined as having a protein content below about 15% by weight and a major fraction of starchy or carbohydrate containing materials.

Examples of proteinaceous materials typically used in commercial pet foods, including dog foods, are: vegetable protein meals such as soybean, cottonseed, and peanut; animal proteins such as casein, albumen, and meat tissue including fresh meat; as well as rendered or dried "meals" such as fish meal, poultry meal, meat meal, bone meal, and the like. Other types of proteinaceous materials include microbial proteins such as yeast and other types of protein such as wheat gluten or corn gluten.

Examples of typical farinaceous materials are grains such as corn, milo, alfalfa, wheat, soy hulls and various other grains which are relatively low in protein. Numerous other materials could also be added to dog food compositions which do not necessarily fall into either the proteinaceous or farinaceous category such as dried whey and other dairy by-products or carbohydrates. The present invention, as noted, is not intended to be limited by specific combinations of ingredients that can be used to formulate a dog food material.

Although the following is not intended to be limiting in that it is not relevant to the function or effectiveness of the palatability enhancing material employed in the present invention, it should, for a complete understanding of the present invention, be recognized that the term "dog food composition" or "dog food material" is generally intended to apply only to commercially sold, nutritionally balanced dog food compositions. These compositions are typically sold in the form of discrete particles of the dog food composition. Dog food compositions meeting this definition may, therefore, be characterized by a minimum protein content since there is a certain minimum protein level required when the dog food composition provides the sole food intake for the dog. Commercially sold dry food compositions typically have a minimum protein content that is dependent upon the age of the animal to which it is to be fed, or if the animal is mature, whether or not it is involved in breeding. Thus, while females involved in breeding, or puppies would require a minimum protein content of at least about 20% by weight and preferably about 20-25% by weight on a 90% dry matter basis in the composition, dogs not in either of the above two categories would require a minimum protein level of at least about 15% by weight based on a 90% dry matter basis in the composition. These figures are based on the assumption that the dog food composition provides the sole food intake for the dogs and, therefore, the resultant commercial dog food compositions typically contain a minimum protein level of at least about 15% by weight on a 90% dry matter basis in the composition in order to meet the nutritional requirements of any type of dog.

This minimum level of protein in commercially sold dog food compositions is contrasted with commercially sold, nutritionally balanced cat food compositions that normally have protein contents that are somewhat higher than dog foods. For example, cat food compositions that are sold commercially typically contain a minimum protein content of at least about 20% by weight on a 90% dry matter basis and usually are substantially above this since cats, when breeding, and kittens require a minimum protein level of at least about 28% by weight on a 90% dry matter basis. Mature cats, on the other hand, not involved in reproduction, require the minimum protein level of at least about 20% by weight on a 90% dry matter basis depending on the exact type of proteinaceous source employed. Preferably, the protein content will be at least 25% by weight and more typically at least about 30% by weight on a 90% dry matter basis in the product. These figures are based on the assumption that the cat food composition provides the sole food intake for the cats.

The flavor enhancing material of the present invention comprises 3,7-dimethyl-1,6-octadien-3-ol, or "linalool" as it is commonly known. The linalool is applied in a palatability enhancing amount to the surface of the dog food composition and preferably in an amount of between about 0.0001 to 0.001% by weight of the composition. This preferred level of linalool on the dog food composition provides a significant palatability improvement over dog food compositions of identical formulation without the linalool. Linalool is not intended to be limited in terms of its actual concentration, physical form, or purity when used with the dog food composition. As this material is sold commercially, it generally will contain not less than 92% by weight of 3,7-dimethyl-1,6-octadien-3-ol. Therefore, although the actual purity of the linalool may be somewhat less than 100%, the levels indicated in the present invention for palatability enhancement are based on the assumption that the linalool is of 100% purity for simplification, when in fact, the purity may have been as low as 92%. It is understood that linalool having a concentration of 3,7-dimethyl-1,6-octadien-3-ol substantially below 92% may be obtained, or may be prepared, for example, by synthesis or by fractionation of the volatile oils in which linalool is found. Thus, linalool having any purity less than 92% may be used in an amount sufficient to provide the levels indicated in the present invention. This material is applied to dog food compositions pursuant to the present invention in a palatability enhancing amount or within a typical range of 0.0001 to 0.01% by weight of the dog food composition.

It is preferred, although not limiting in the present invention, that an edible fat be used together with the linalool to provide an effective coating of the flavor enhancing material on the dog food composition. The fat typically is included in commercial dog food compositions to provide an energy source for the animal and as such is usually applied as a coating to the dog food product. Therefore, although the best result and most uniform application of the linalool to the dog food composition is achieved when the fat is used, it should not be interpreted as being critical to palatability response since a significant response for dogs can still be attained with the linalool in the absence of the fat. The specific type of fat that is suitable for use in the instant invention is not considered to be critical since the exact type employed will be entirely dependent upon availability and free fatty acid content. Typical fats that are employed include animal fats such as lard and tallow. The particular level of fat employed is entirely dependent on the nutritional characteristics desired of the dog food and is not critical to the effectiveness of the linalool as a palatability enhancing ingredient. Typical levels of fat that are employed together with the linalool on the dog food composition are between about 5 and 20% by weight of the dog food composition.

Insofar as the application of the palatability enhancing amount of linalool to the surfaces of the particles of the dog food composition, it is preferred to apply the linalool, which is typically soluble in the fat, admixed with the fat material in order to provide a uniform distribution of the linalool on the surfaces of the particles, thereby assuring maximum availability of this material to the taste receptors of the dog. The soluble nature of the linalool in the fat provides an additional advantage since the uniform application of this material to the surfaces of the particles can usually be assured. The linalool may be applied as a separate coating by spraying a dispersion of the linalool in another material on the particles and then applying a coating of an edible fat thereover. Alternatively, the fat coating could be applied first followed by application of the linalool thereover. It is preferred, however, to simply admix the fat and linalool, and apply this mixture to the surfaces of the particles of the dog food composition. This eliminates the need for two separate spraying steps and provides a uniform and efficient means for applying both materials to the surfaces of the particles. In any event, the particular manner in which this material is applied is not intended to be critical to the practice of the present invention and a significant palatability boost can still be achieved regardless of the order of addition of linalool or fat. Typically the fat, or fat and linalool mixture, is heated to insure that the fat is completely liquid prior to application by spraying since this facilitates spraying of the fat on the dog food composition.

With regard to the production of dried dog food compositions according to the present method of enhancing the palatability thereof, dog food particles such as those of the expanded or extruded type are transported while in a somewhat heated condition by a belt conveyor to a spray chamber. If a dried product is desired, the particles are first dried to a moisture level of below about 15% by forced air. A mixture of the linalool and melted fat is separately formed in a mixing tank or metering pump by blending the requisite level of fat and linalool and is introduced to the spray chamber. The fat solution of linalool is then sprayed on the dog food particles to provide the desired level of fat and a palatability enhancing amount of linalool on the dog food particles. Following coating of the dog food particles, the spray coated particles are collected at the bottom of the spray chamber and then transported, if desired, to a tumbling drum or similar apparatus wherein the coated particles are tumbled repeatedly to improve the uniformity of the coating. The coated dog food particles can then be removed from the tumbling drum and cooled to ambient temperature.

If it is desired to apply the linalool and fat by separate sprayings of the particles of the dog food composition, successive spray chambers can be provided for application of the linalool and for application of fat after which the sequentially coated particles can be tumbled in a drum to improve the uniformity of the coatings prior to being cooled to ambient temperature and packaged.

Application of the linalool to the dog food composition in a palatability enhancing amount and preferably in an amount of between about 0.0001 and 0.001% by weight results in a statistically significant palatability response from dogs in comparison to the same dog food composition without linalool. A significant improvement in pet food formulation is, therefore, achieved by the application of linalool since palatability of the composition to the pet is usually the controlling factor in the commercial success of such compositions.

Pursuant to a better understanding of the instant invention, the following Examples describe illustrative but non-limiting embodiments thereof.

Dog Food Composition Formulation

A dog food composition was formulated by mixing the following ingredients in the indicated proportions by weight:

| Ground yellow corn | 41% |
| --- | --- |
| Ground whole wheat | 4.3% |
| Corn gluten feed | 4% |
| Corn gluten meal (60% protein) | 9.5% |
| Wheat germ | 0.5% |
| Soybean meal | 14% |
| Meat & Bone Meal | 18.4% |
| Salt | 0.3% |
| Minerals & Vitamins | 1.5% |

This mixture was then transferred to a steam conditioner and subjected to steam and moisture in order to adjust the moisture content to between about 20 and 40% by weight. The conditioned mixture was then extruded under conditions of elevated temperature and pressure to form a continuous strand of expanded product that was segmented into discrete particles or pieces by a rotating cutting knife upon exit of the strand from the extruder. The particles were then conveyed to a forced air drying system and the moisture level reduced to below about 10% by weight. If an intermediate moisture composition is to be produced, this forced air drying is omitted. The dried, extruded dog food particles after exit from the forced air oven and prior to cooling were transported from the dryer to a spray chamber by a bulk conveyor. The particles were dropped from the conveyor belt in a sheet and fell through the spray chamber. Spray heads located on both sides of the falling sheet sprayed a solution of about 6.5% animal fat, about 0.01% Vitamin A & E oil, and linalool on the hot particles as they fell through the spray chamber.

The above identified mixture was heated to a temperature of about 140° F. to facilitate spraying on the hot particles of the dog food composition in the spray chamber. The spray coated dog food particles were collected at the bottom of the spray chamber and transported to a tumbling drum. The tumbling drum was maintained at a temperature above the melting point of the fat and the particles were tumbled until they had a substantially uniform coating of the fat on the surfaces thereof. The coated food particles were then removed from the drum and cooled to ambient temperature. The resultant dried dog food composition had a moisture content of less than about 12% by weight, (15–45% for the intermediate moisture composition), and a protein content above about 15% by weight on a 90% dry matter basis.

EXAMPLE 1

A dog food composition was formulated as detailed above with an amount of linalool added to the spray solution so that the final dog food composition contained 0.005% of linalool by weight of the composition as a palatability enhancer. This dog food composition was fed in a test situation to 20 dogs for a period of 4 days against a control that was an identically formulated ration except that it did not contain linalool. The test ration was comparatively evaluated against the control for palatability response when fed wet and when fed dry to dogs. Wet feeding to the dogs consisted of the addition of 50 grams of water to each 100 grams of the apportioned quantity of ration immediately prior to feeding.

TABLE 1

| Sample | % Linalool by weight | Total Consumed (lbs) | Dogs Preferring | Dogs, No Preference | Statistical Significance |
|---|---|---|---|---|---|
| | | Fed On A Dry Basis | | | |
| Control | 0 | 40.3 | 9 | | N.S.* |
| Test Ration | 0.005% | 44.0 | 11 | | |
| | | Fed On A Wet Basis | | | |
| Control | 0 | 62.9 | 6 | 0 | P<.01 |
| Test Ration | 0.005% | 84.8 | 14 | | |

*N.S. is an abbreviation for "not statistically significant". A numerical preference was shown, however, for the ration containing linalool.

EXAMPLE 2

A dog food composition was formulated as detailed above with an amount of linalool added to the spray solution so that the final dog food composition contained 0.001% of linalool by weight of the composition as a palatability enhancer. This dog food composition was fed in a test situation to 20 dogs for a period of 2 days against a control that was an identically formulated ration except that it did not contain linalool. The test ration was comparatively evaluated against the control for palatability response when fed wet and when fed dry to dogs. Wet feeding was conducted as stated in Example 1.

TABLE 2

| Sample | % Linalool by weight | Total Consumed (lbs) | Dogs Preferring | Dogs, No Preference | Statistical Significance |
|---|---|---|---|---|---|
| | | Fed On A Dry Basis | | | |
| Control | 0 | 5.7 | 1 | | |
| Test Ration | 0.001% | 20.6 | 19 | | |
| | | Fed On A Wet Basis | | | |
| Control | 0 | 20.8 | 0 | 0 | P<.01 |
| Test Ration | 0.001% | 48.2 | 20 | | |

EXAMPLE 3

Dried, extruded dog food particles formulated as in Example 2 and containing 0.001% linalool by weight were fed in a test situation to 20 dogs for a period of 4 days against a control that was an identically formulated ration except that it did not contain linalool. The test ration was comparatively evaluated against the control for palatability response when fed wet and when fed dry to dogs. Wet feeding was conducted as stated in Example 1

TABLE 3

| Sample | % Linalool by weight | Total Consumed (lbs) | Dogs Preferring | Dogs, No Preference | Statistical Significance |
|---|---|---|---|---|---|
| | | Fed On A Dry Basis | | | |
| Control | 0 | 25.6 | 4 | 0 | P<.01 |
| Test Ration | 0.001% | 42.2 | 16 | | |

TABLE 3-continued

| Sample | % Linalool by weight | Total Consumed (lbs) | Dogs Preferring | Dogs, No Preference | Statistical Significance |
|---|---|---|---|---|---|
| Fed On A Wet Basis | | | | | |
| Control | 0 | 37.7 | 5 | 0 | P<.01 |
| Test Ration | 0.001% | 61.3 | 15 | | |

EXAMPLE 4

A dog food composition was formulated as detailed above with an amount of linalool added to the spray solution so that the final dog food composition contained 0.00025% of linalool by weight of the composition as a palatability enhancer. This dog food composition was fed in a test situation to 20 dogs for a period of 2 days against a control that was an identically formulated ration except that it did not contain linalool. The test ration was comparatively evaluated against the control for palatability response when fed wet and when fed dry to dogs. Wet feeding was conducted as stated in Example 1.

TABLE 4

| Sample | % Linalool by weight | Total Consumed (lbs) | Dogs Preferring | Dogs, No Preference | Statistical Significance |
|---|---|---|---|---|---|
| Fed On a Dry Basis | | | | | |
| Control | 0 | 14.3 | 5 | 2 | P<.01 |
| Test Ration | 0.00025 | 22.3 | 13 | | |
| Fed On A Wet Basis | | | | | |
| Control | 0 | 34.3 | 3 | 0 | P<.01 |
| Test Ration | 0.00025 | 45.4 | 17 | | |

EXAMPLE 5

Dried, extruded dog food particles formulated as in Example 4 and containing 0.00025% linalool by weight were fed in a test situation to 20 dogs for a period of 4 days against a control that was an identically formulated ration except that it did not contain linalool. The test ration was comparatively evaluated against the control for palatability response when fed wet and when fed dry to dogs. Wet feeding was conducted as stated in Example 1.

TABLE 5

| Sample | % Linalool by weight | Total Consumed (lbs) | Dogs Preferring | Dogs, No Preference | Statistical Significance |
|---|---|---|---|---|---|
| Fed On A Dry Basis | | | | | |
| Control | 0 | 28.0 | 4 | 0 | P<.01 |
| Test Ration | 0.00025 | 63.8 | 16 | | |
| Fed On A Wet Basis | | | | | |
| Control | 0 | 51.8 | 4 | 0 | P<.01 |
| Test Ration | 0.00025 | 88.8 | 16 | | |

EXAMPLE 6

A dog food composition was formulated as detailed above with an amount of linalool added to the spray solution so that the final dog food composition contained 0.0001% of linalool by weight of the composition as a platability enhancer. This dog food composition was fed in a test situation to 20 dogs for a period of 2 days against a control that was an identically formulated ration except that it did not contain linalool. The test ration was comparatively evaluated against the control for palatability response when fed wet and when fed dry to dogs. Wet feeding was conducted as stated in Example 1.

TABLE 6

| Sample | % Linalool by weight | Total Consumed (lbs) | Dogs Preferring | Dogs, No Preference | Statistical Significance |
|---|---|---|---|---|---|
| Fed on Dry Basis | | | | | |
| Control | 0 | 4.9 | 4 | 4 | P<.01 |
| Test Ration | 0.0001 | 12.2 | 12 | | |
| Fed On A Wet Basis | | | | | |
| Control | 0 | 20.8 | 1 | 0 | P<.01 |
| Test Ration | 0.0001 | 47.6 | 19 | | |

EXAMPLE 7

Dried, extruded dog food particles formulated as in Example 6 and containing 0.0001% linalool by weight were fed in a test situation to 20 dogs for a period of 4 days against a control that was an identically formulated ration except that it did not contain linalool. The test ration was comparatively evaluated against the control for palatability response when fed wet and when fed dry to dogs. Wet feeding was conducted as stated in Example 1.

TABLE 7

| Sample | % Linalool by weight | Total Consumed (lbs) | Dogs Preferring | Dogs, No Preference | Statistical Significance |
|---|---|---|---|---|---|
| Fed On A Dry Basis | | | | | |
| Control | 0 | 41.1 | 4 | 0 | P<0.1 |
| Test Ration | 0.0001 | 57.7 | 16 | | |
| Fed On A Wet Basis | | | | | |
| Control | 0 | 67.8 | 5 | 0 | P<.01 |
| Test Ration | 0.0001 | 97.4 | 15 | | |

An examination of the above identified palatability data indicates that on either a wet or dry basis, the dog food composition containing the linalool was significantly preferred by the dogs. This is illustrated by the total consumption data, as well as the number of dogs preferring one ration over the other. Furthermore, statistical evaluation of the above data indicates this response to be statistically significant. Statistical evaluation was performed in accordance with the Wilcoxon Signed Rank Test*. This test is believed to provide a reliable statistical determination of whether there is, in fact, a preference for either ration in this type of palatability experiment wherein the test ration and control ration are simultaneously presented to each dog on a free choice basis.

*The Wilcoxon signed rank test was proposed by F. Wilcoxon in *Biometrics Bulletin*, 1:80 (1945). Explanations and applications of this test may be found in: G. W. SNEDECOR, W. G. COCHRAN. *Statistical Methods*, 6th ed., pp. 128-130. The Iowa State University Press, Ames, Iowa (1967); *Experimental Statistics*, pp. 16-1 to 16-3. United States Department of Commerce, National Bureau of Standards Handbook 91 (1963); R. G. D. STEEL, J. H. TORRIE. *Principles and Procedures of Statistics*, pp. 402-403. McGraw-Hill Book Company, Inc., New York (1960); C. I. BLISS. *Statistics in Biology*, pp. 225-228. McGraw-Hill Book Company, Inc., New York (1967).

What is claimed is:

1. A dog food composition having greater palatability to dogs than the same composition without the palatability enhancer, comprising a nutritionally balanced mixture of proteinaceous and farinaceous ingredients, and an added palatability enhancing 0.0001 to 0.01% by weight amount of linalool.

2. The dog food composition of claim 1 wherein the composition has a coating of an edible fat.

3. The dog food composition of claim 2 wherein the edible fat is present in an amount of between about 5 and 20% by weight of the composition.

4. The dog food composition of claim 1 wherein the composition has a protein content of at least about 15% by weight of the total composition on a 90% dry matter basis.

5. The dog food composition of claim 1 wherein the linalool is present in an amount of between about 0.0001 to 0.001% by weight of the composition.

6. The dog food composition of claim 1 wherein the linalool is present in an amount of 0.00025% by weight of the composition.

7. The dog food composition of claim 1 wherein the dog food has a moisture content of less than about 50% by weight.

8. A dog food composition having greater palatability to dogs than the same composition without the palatability enchancer comprising a nutritionally balanced mixture of proteinaceous and farinaceous ingredients with a protein content of at least about 15% by weight of the total composition on a 90% dry matter basis, and an added palatability enhancing 0.0001 to 0.01% by weight amount of linalool.

9. The dog food composition of claim 8 wherein the composition is coated with an edible fat.

10. The dog food composition of claim 8 wherein the composition has a protein content of at least about 20% by weight of the total composition on a 90% dry matter basis.

11. The dog food composition of claim 8 wherein the linalool is present in an amount of between about 0.0001 to 0.001% by weight of the composition.

12. The dog food composition of claim 8 wherein the linalool is present in an amount of 0.00025% by weight of the composition.

13. The dog food composition of claim 8 wherein the dog food has a moisture content of less than about 50% by weight.

14. A dog food composition having greater palatability to dogs than the same composition without the palatability enhancer comprising a nutritionally balanced mixture of proteinaceous and farinaceous ingredients with a protein content of at least about 15% by weight of the total composition on a 90% dry matter basis having a coating of an edible fat and added linalool, the linalool being present in an amount of between about 0.0001 and 0.01% by weight of the composition to enhance the palatability of the composition to dogs.

15. The dog food composition of claim 14 wherein the edible fat is present in the coating in an amount of between about 5 and 20% by weight of the dog food composition.

16. The dog food composition of claim 14 wherein the linalool is present in an amount of between about 0.0001 to 0.001% by weight of the composition.

17. The dog food composition of claim 14 wherein the linalool is present in an amount of 0.00025% by weight of the composition.

18. The dog food composition of claim 14 wherein the composition has a moisture content of less than about 50% by weight.

19. A dog food composition having greater palatability to dogs than the same composition without the palatability enhancer comprising a nutritionally balanced mixture of proteinaceous and farinaceous ingredients with a protein content of at least about 15% by weight of the total composition on a 90% dry matter basis having a moisture content of less than about 50% by weight of the composition and having a coating of an edible fat and added linalool, the linalool being present in an amount of between about 0.0001 and 0.001% by weight of the composition to enhance the palatability of the composition to dogs, the fat being present in the coating in an amount of between about 5 to 20% by weight of the composition.

20. The dog food composition of claim 19 wherein the linalool is present in an amount of 0.00025% by weight of the composition.

21. A method of enhancing the palatability of a dog food composition for dogs comprising applying a palatability enhancing 0.0001 to 0.01% by weight amount of linalool to discrete particles of the dog food composition.

22. The method of claim 21 wherein the composition is also coated with an edible fat.

23. The method of claim 22 wherein the edible fat is present in an amount of between about 5 and 20% by weight of the composition.

24. The method of claim 21 wherein the dog food composition comprises a nutritionally balanced proteinaceous-farinaceous mixture with a protein content of at least about 15% by weight of the total composition on a 90% dry matter basis.

25. The method of claim 21 wherein the linalool is applied in an amount between about 0.0001 and 0.001% by weight of the composition.

26. The method of claim 21 wherein the linalool is applied in an amount of 0.00025% by weight of the composition.

27. The method of claim 21 wherein the dog food composition has a moisture content of below about 50% by weight.

28. A method of enhancing the palatability of a dog food composition for dogs comprising (a) applying a palatability enhancing 0.0001 to 0.01% by weight amount of linalool to discrete particles of the dog food composition and (b) applying to the discrete particles a coating of an edible fat over the applied linalool to provide a level of fat of between about 5 and 20% by weight of the composition.

29. The method of claim 28 wherein the linalool is applied in an amount between about 0.0001 and 0.001% by weight of the composition.

30. The method of claim 28 wherein the linalool is applied in an amount of 0.00025% by weight of the composition.

31. The method of claim 28 wherein the dog food composition comprises a nutritionally balanced proteinaceous-farinaceous mixture with a protein content of at least about 15% by weight of the total composition on a 90% dry matter basis.

32. The method of claim 28 wherein the dog food composition has a moisture content of below about 50% by weight.

33. The method of claim 28 wherein the dog food composition has a protein content of at least about 20% by weight of the total composition on a 90% dry matter basis.

34. A method of enhancing the palatability of a dog food composition for dogs comprising (a) applying a coating of an edible fat to discrete particles of the dog food composition to provide a level of fat of between about 5 and 20% by weight of the composition and (b) applying a palatability enhancing 0.0001 to 0.01% by weight amount of linalool to the coated composition.

35. The method of claim 34 wherein the linalool is applied in an amount of between about 0.0001 and 0.001% by weight of the composition.

36. The method of claim 34 wherein the linalool is applied in an amount of 0.00025% by weight of the composition.

37. The method of claim 34 wherein the dog food composition comprises a nutritionally balanced proteinaceous-farinaceous mixture with a protein content of at least about 15% by weight of the total composition on a 90% dry matter basis.

38. The method of claim 34 wherein the dog food composition has a moisture content of below about 50% by weight.

39. A method of enhancing the palatability of a dog food composition for dogs comprising (a) forming a mixture of an edible fat and linalool (b) coating discrete particles of the dog food composition with the mixture to provide a level of fat of between about 5 and 20% by weight of the composition and a palatability enhancing 0.0001 to 0.01% by weight amount of linalool.

40. The method of claim 39 wherein the dog food composition comprises a nutritionally balanced proteinaceous-farinaceous mixture with a protein content of at least about 15% by weight of the total composition on a 90% dry matter basis.

41. The method of claim 39 wherein the linalool is applied in an amount of between about 0.0001 and 0.001% by weight of the composition.

42. The method of claim 39 wherein the linalool is present in an amount of 0.00025% by weight of the composition.

43. The method of claim 39 wherein the dog food composition has a moisture content of below about 50% by weight.

* * * * *